United States Patent
Murakami et al.

(10) Patent No.: US 12,085,739 B2
(45) Date of Patent: Sep. 10, 2024

(54) DIFFRACTIVE OPTICAL ELEMENT AND ILLUMINATION OPTICAL SYSTEM

(71) Applicant: AGC Inc., Tokyo (JP)

(72) Inventors: Ryota Murakami, Fukushima (JP); Kensuke Ono, Tokyo (JP); Motoshi Nakayama, Fukushima (JP)

(73) Assignee: AGC Inc., Tokyo (JP)

( * ) Notice: Subject to any disclaimer, the term of this patent is extended or adjusted under 35 U.S.C. 154(b) by 632 days.

(21) Appl. No.: 17/227,520

(22) Filed: Apr. 12, 2021

(65) Prior Publication Data

US 2021/0255374 A1 Aug. 19, 2021

Related U.S. Application Data

(63) Continuation of application No. PCT/JP2019/039555, filed on Oct. 7, 2019.

(30) Foreign Application Priority Data

Oct. 15, 2018 (JP) ................................. 2018-194341

(51) Int. Cl.
*G02B 5/18* (2006.01)
*G01S 7/481* (2006.01)
(Continued)

(52) U.S. Cl.
CPC ............ *G02B 5/1814* (2013.01); *G01S 7/481* (2013.01); *G01S 17/931* (2020.01); *G02B 27/44* (2013.01)

(58) Field of Classification Search
CPC .... G02B 5/1814; G02B 27/44; G02B 5/1866; G02B 27/425; G02B 3/08; G02B 5/1876;
(Continued)

(56) References Cited

U.S. PATENT DOCUMENTS 5,229,883 A * 7/1993 Jackson ............. G02B 27/0037
359/569
5,494,783 A * 2/1996 Harris .................. G02B 5/1876
359/569
(Continued)

FOREIGN PATENT DOCUMENTS

JP 10-135118 A 5/1998
JP 11-133263 A 5/1999
(Continued)

OTHER PUBLICATIONS

International Search Report issued Dec. 17, 2019 in PCT/JP2019/039555 filed on Oct. 7, 2019, citing documents AP, AQ, & AT-AU therein, 2 pages.

(Continued)

*Primary Examiner* — Darryl J Collins
*Assistant Examiner* — Matthew Y Lee
(74) *Attorney, Agent, or Firm* — Oblon, McClelland, Maier & Neustadt, L.L.P.

(57) ABSTRACT

A diffractive optical element includes: a diffraction unit; and a lens unit disposed on a light incident side of the diffraction unit. The lens unit includes: a substrate; and a protrusion and recess portion disposed on a side opposite to a light incident side of the substrate. The protrusion and recess portion includes: a periodic structure of a relief-protrusion portion disposed in a central part, a periodic structure of a stepwise grating disposed in a central part simulating the relief-protrusion portion, or a combination thereof; and a grating disposed in a portion other than the central part. The number of steps of the stepwise grating disposed in the central part is larger than the number of steps of the grating disposed in the portion other than the central part.

10 Claims, 6 Drawing Sheets

(51) Int. Cl.
*G01S 17/931* (2020.01)
*G02B 27/44* (2006.01)

(58) Field of Classification Search
CPC .......... G01S 7/481; G01S 17/931; F21V 5/04; F21V 5/045; B29D 11/00269; B29L 2011/005

See application file for complete search history.

(56) References Cited

U.S. PATENT DOCUMENTS

| | | | |
|---|---|---|---|
| 6,480,334 B1 * | 11/2002 | Farn | G02B 26/0808 359/566 |
| 2002/0005938 A1 | 1/2002 | Omura | |
| 2004/0119962 A1 | 6/2004 | Omura | |
| 2008/0078741 A1 | 4/2008 | Kotani | |
| 2008/0106746 A1 | 5/2008 | Shpunt et al. | |
| 2009/0096783 A1 | 4/2009 | Shpunt et al. | |
| 2010/0177164 A1 | 7/2010 | Zalevsky et al. | |
| 2010/0322059 A1 * | 12/2010 | Yasui | G02B 27/4238 |
| 2011/0096182 A1 | 4/2011 | Cohen et al. | |
| 2011/0158508 A1 | 6/2011 | Shpunt et al. | |
| 2012/0281240 A1 | 11/2012 | Cohen et al. | |
| 2013/0136305 A1 | 5/2013 | Shpunt et al. | |
| 2013/0155195 A1 | 6/2013 | Zalevsky et al. | |
| 2015/0287205 A1 | 10/2015 | Zalevsky et al. | |
| 2017/0004623 A1 | 1/2017 | Zalevsky et al. | |
| 2017/0187997 A1 | 6/2017 | Hsiao et al. | |
| 2017/0287923 A1 | 10/2017 | Zalevsky et al. | |
| 2019/0072776 A1 | 3/2019 | Nishio et al. | |
| 2019/0319036 A1 | 10/2019 | Zalevsky et al. | |

FOREIGN PATENT DOCUMENTS

| | | |
|---|---|---|
| JP | 2001-343582 A | 12/2001 |
| JP | 2003-337215 A | 11/2003 |
| JP | 2006-227503 A | 8/2006 |
| JP | 2007-286499 A | 11/2007 |
| JP | 2008-089923 A | 4/2008 |
| JP | 2011-215267 A | 10/2011 |
| JP | 5174684 B2 | 4/2013 |
| JP | 6344463 B2 | 6/2018 |
| WO | WO 2018/063780 A1 | 4/2018 |

OTHER PUBLICATIONS

Shiono, "High Efficiency Diffractive Optical Elements", The Japan Society of Applied Physics, Subcommittee, Optics & Photonics, Japan, Japanese Journal of Optics, vol. 32 (8), 2003, pp. 492-494 (with English Abstract).

* cited by examiner

DIFFRACTIVE OPTICAL ELEMENT AND ILLUMINATION OPTICAL SYSTEM

TECHNICAL FIELD

The present invention relates to a diffractive optical element for applying light spots having a predetermined pattern to a predetermined projection surface, and an illumination optical system including the diffractive optical element.

BACKGROUND ART

There is a device applying predetermined light to a measured object serving as a measurement target and detecting light scattered by the measured object, thereby measuring the position, shape, etc. of the measured object (see, for example, Patent Literature 1). In such a measurement device, a diffractive optical element can be used for applying a specific light pattern to a measurement target.

Common examples of the diffractive optical element include those obtained by processing a substrate surface so as to have protrusions and recesses. In the case of such a protrusion and recess configuration, light is diffracted by utilizing a refractive index difference between a material (e.g. air having a refractive index of 1) with which the recess is filled and a material of the protrusion to give a desired optical path length difference.

A light pattern generated utilizing such a diffraction action is defined as a group of light spots being generated by a plurality of diffracted lights and each having a light quantity not less than a predetermined light quantity. A specific light pattern can be formed by controlling the position or light intensity of the light spot. In addition, in the case where respective light spots are caused to overlap one another, illumination light can be formed.

Examples of the control of the position or light intensity of the light spot include, for example, generation of a light pattern which makes the light quantity within a detection surface uniform for the purpose of performing detection with high detection sensitivity.

As the incident light on the Diffractive Optical Element (DOE), parallel light is often used because a diffraction design can be made independently of the distance from a light source. For example, Patent Literatures 2 and 3 describe a configuration in which a collimating lens for converting scattered light emitted from a light source into parallel light is provided between the light source and the diffractive optical element.

In addition, as the technical literature related to the present invention, Non-Patent Literature 1 describes the relationship between a primary diffraction efficiency and a standardized period ($\Lambda/\lambda$) in a blazed diffractive optical element having a sawtooth-shaped cross-section. Here, $\Lambda$ represents a period in a blazed element having a uniform period, and $\lambda$ represents a wavelength.

CITATION LIST

Patent Literature

Patent Literature 1: Japanese Patent No. 5174684
Patent Literature 2: Japanese Patent No. 6344463
Patent Literature 3: U.S. Patent Application Publication No. 2017/0187997, description

Non-Patent Literature

Non-Patent Literature 1: Teruhiro Shiono, "High-Efficiency Diffractive Optical Element", The Japan Society of Applied Physics, Subcommittee, Optics & Photonics Japan, Japanese Journal of Optics, vol. 32 (8), 2003, pp. 492-494

SUMMARY OF INVENTION

Technical Problem

In the case of simply converting light emitted from a light source into parallel light by using a collimating lens, since the thickness of the collimating lens is added to the thickness of the diffractive optical element, there is a problem of an increase in size of the entire optical system.

For example, considering, as a measurement device, a remote sensing device that is used for facial recognition or focusing of a camera device in a smartphone, etc., a remote sensing device that is connected to a game machine, etc. and used for capturing motion of a user, and an LIDAR (Light Detecting and Ranging) device in a vehicle, etc. used for detecting a peripheral object, in order to respond to a demand in terms of design or a demand for thinning and downsizing of an overall casing provided with the sensor, a diffractive optical element for performing sensing and an optical system thereof are also required to be reduced in thickness.

Examples of possible methods for thinning an optical system include a method of changing a collimating lens to a Fresnel zone plate. However, in the case where the thickness is reduced as much as possible, not only the division number increases but also the division pitch (division width) decreases particularly in a peripheral part, causing a problem where machining of a mold for manufacturing a Fresnel lens is difficult. In addition, in the case of changing light beams emitted from a light source into parallel light by utilizing a Fresnel zone plate, the beam quality disadvantageously deteriorates, for example, stray light is generated due to the effect of diffraction at a division position of a lens or the outgoing beams produce concentric light/dark stripes (an undesired light intensity contrast).

Then, it is conceived to collimate scattered light not by a refractive lens but by a diffractive lens. Although a light utilization efficiency of a diffractive lens is inferior to that of a refractive lens, the diffractive lens is considered to be advantageous to the diffractive optical element, i.e., the outgoing destination, in view of the performance of shaping laser beams. For example, the diffractive lens can reduce the unnecessary 0th-order light or can control the light intensity distribution of outgoing beams.

In the case of shaping beams by utilizing a diffractive lens, examples of the method for increasing the light utilization efficiency include a method using a kinoform. The kinoform is one of techniques of reconstructing only a reconstruction image of the required diffraction order, where assuming the amplitude component of the diffracted wave (the amplitude of the Fourier-transformed image of a virtual object) is constant, its phase distribution is modulated with an optical thickness and encoded by the remainder with a divisor of $2\pi$ relative to the phase of incident light, and is also called a wavefront reconstruction element. An example of the kinoform is an element where assuming the amplitude of the Fourier-transformed image of a virtual object is constant, the distribution is encoded as such a relief hologram that the thickest portion on a kinoform is delayed by $2\pi$ [rad] in terms of phase angle compared with the thinnest portion so as to give a phase change to convert the incident planar wave into a desired wavefront. In this example, the optical thickness of the kinoform is the remainder with a divisor of Λ. Here, λ is the wavelength of a reconstruction image.

The kinoform is characterized in that since in an ideally manufactured kinoform, almost all incident light is utilized for the reconstruction of a single desired image and therefore, the light utilization efficiency is high. However, although the theoretical light utilization efficiency of the kinoform is high, it is very difficult to shape a relief image obtained by a design into an actual element, and there is still a problem in the difficulty and stability of the processing. For example, a kinoform lens obtained by forming an optical lens into a kinoform has a periodic fine relief structure as denoted by symbol 95 of FIG. 12, but it is difficult to stably obtain such a fine relief structure only by adjusting the exposure amount by use of a grayscale mask. In particular, it has been found that the vicinity of the peripheral part where the pitch becomes fine holds a fundamental problem in addition to the processing difficulty.

Figure 12:
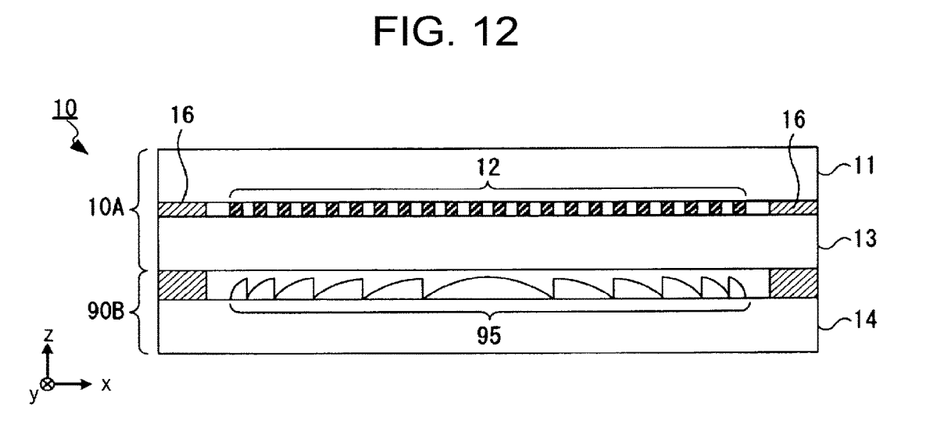
FIG. 12 is a schematic cross-sectional diagram illustrating an example of the diffractive optical element 10 including the lens unit 90B of Comparative Example.
Figure 13:
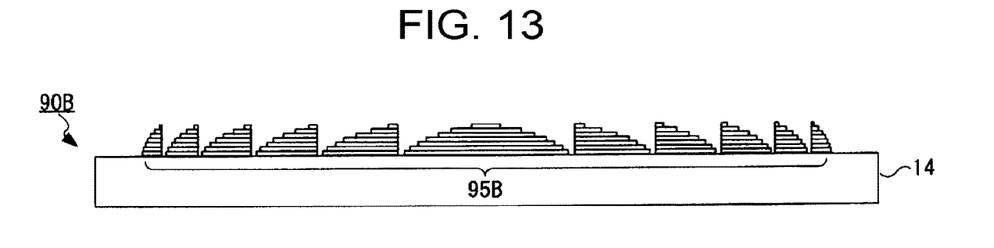
FIG. 13 is a schematic cross-sectional diagram illustrating another example of the lens unit 90B of Comparative Example.

FIG. 13 is an example where a curved surface shape of a kinoform lens illustrated in FIG. 12 is simulatedly realized by a multi-level diffraction grating (in this example, 8-level). However, even if such a multi-level diffraction grating is utilized, the aspect ratio that is a ratio of height to pitch increases around the periphery part and therefore, the processing difficulty still remains as a problem.

Furthermore, according to Non-Patent Literature 1, in the relationship between a primary diffraction efficiency and a standardized period ($\Lambda/\lambda$) of a blazed element having a uniform period calculated using a differential method model that is one of theories of vector analysis, besides a period in a wavelength order, a period at which the diffraction efficiency extremely drops is present around $\Lambda/\lambda$ of 1.5 to 2.5. Depending on the designed wavelength, the period may possibly correspond to the standardized period above at any position within the plane. In this case, deterioration of the diffraction efficiency or passing-through of 0th-order light may occur. Such a problem of deterioration of the diffraction efficiency or passing-through of 0th-order light is considered to occur as well also around the peripheral part of a kinoform.

Accordingly, an object of the present invention is to provide a diffractive optical element and an illumination optical system, where in addition to being thin and excellent in processability, the light utilization efficiency can be further increased or unnecessary outgoing light can be reduced.

Solution to Problem

A diffractive optical element according to the present invention, includes: a diffraction unit configured to split light by using a diffraction effect; and a lens unit configured to convert incident light into parallel light, the lens unit being disposed on a light incident side of the diffraction unit, in which the lens unit includes: a substrate; and a protrusion and recess portion disposed on a side opposite to a light incident side of the substrate, in which the protrusion and recess portion includes: a periodic structure of a relief-protrusion portion that is disposed in a central part and is a protrusion part of a relief shape having a curved cross-section, a periodic structure of a stepwise grating that is disposed in a central part, has two or more steps assuming the substrate as a first step and simulates the relief-protrusion portion, or a combination thereof; and a grating disposed in a portion other than the central part, and in which the number of steps of the stepwise grating disposed in the central part is larger than the number of steps of the grating disposed in the portion other than the central part.

An illumination optical system according to the present invention, includes: a light source configured to emit scattered light; and the aforementioned diffractive optical element, being configured such that the scattered light is incident on the diffractive optical element and the incident light is split into a plurality of parallel diffracted lights to exit, in which a predetermined light pattern is formed on a predetermined projection surface by the diffracted lights exiting from the diffractive optical element.

Advantageous Effects of Invention

According to the present invention, a diffractive optical element and an illumination optical system, which are, in addition to being thin and excellent in processability, capable of further increasing the light utilization efficiency or capable of reducing unnecessary outgoing light, can be provided.

DESCRIPTION OF EMBODIMENTS

Figure 1:
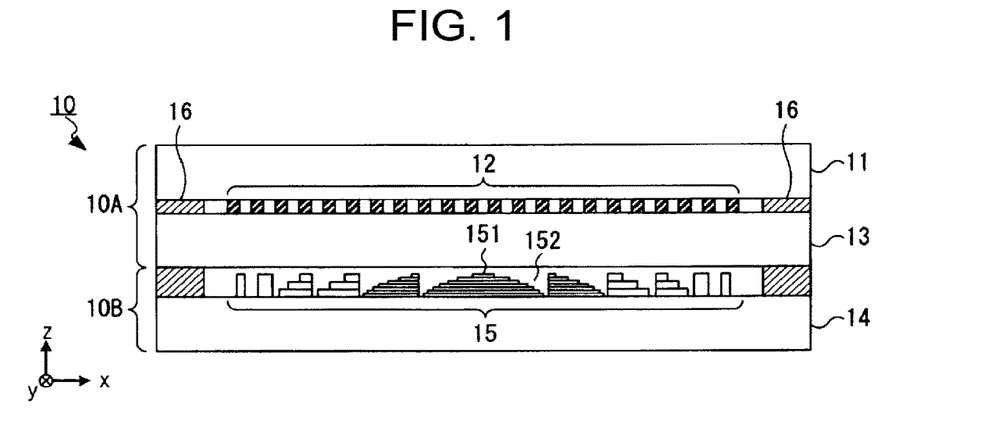
FIG. 1 is a schematic cross-sectional diagram illustrating an example of the diffractive optical element 10 according to a first embodiment.

The embodiments of the present invention are descried below by referring to the drawings. FIG. 1 is a schematic cross-sectional diagram illustrating an example of the diffractive optical element 10 according to a first embodiment.

The diffractive optical element 10 incudes a diffraction unit 10A and a lens unit 10B. The diffraction unit 10A includes a substrate 11, a substrate 13, and a first protrusion and recess portion 12 provided between the substrates 11 and 13. The lens unit 10B includes a substrate 14 and a second protrusion and recess portion 15 provided between the substrates 13 and 14. Each of a pair of the substrate 11 and the substrate 13, and a pair of the substrate 13 and the substrate 14 are laminated together at a desired height by an adhesive 16.

The substrates 11, 13 and 14 are not particularly limited as long as they are a member transparent to the operating wavelength, such as glass or a resin. The operating wavelength is the wavelength band of light incident on the diffractive optical element 10. The description below assumes the light in a specific wavelength band (for example, 850 nm+20 nm, etc.) out of light having a wavelength of 700 nm to 2,000 nm is incident on the diffractive optical element 10, but the operating wavelength is not limited thereto. In addition, unless otherwise indicated, the visible range is a wavelength range of 400 nm to 780 nm, the infrared range is a wavelength range of 780 nm to 2,000 nm, particularly from 800 nm to 1,000 nm, which is supposed to be a near infrared region, and the ultraviolet range is a wavelength range of 300 nm to 400 nm, particularly from 360 nm to 380 nm, which is supposed to be a near ultraviolet region. The visible light is light in the visible range, the infrared light is light in the infrared range, and the ultraviolet light is light in the ultraviolet range.

The first protrusion and recess portion 12 is a protrusion and recess structure having a protrusion and recess pattern exerting a diffraction action on incident light to split the light and generate a plurality of diffracted lights. More specifically, the protrusion and recess pattern is a two-dimensional pattern in a plan view of level differences formed by protrusion parts or recess parts of the first protrusion and recess portion 12. Here, the "plan view" is a plane as viewed from the traveling direction of light incident on the diffractive optical element 10 and corresponds to a plane as viewed from the normal direction of the main surface of the diffractive optical element 10. The protrusion and recess pattern is configured so that light spots formed by each of a plurality of diffracted lights generated by the protrusion and recess pattern can realize a predetermined pattern on a predetermined projection surface, etc.

The protrusion and recess pattern of the first protrusion and recess portion 12 is obtained, for example, by Fourier-transforming a phase distribution of light exiting from the protrusion and recess pattern. The predetermined pattern that the protrusion and recess pattern realizes is not particularly limited.

The second protrusion and recess portion 15 of the lens unit 10B converts incident light of scattered light into parallel light by utilizing a diffraction action and allows the parallel light to exit. The parallel light exiting from the second protrusion and recess portion is caused to be incident on the diffraction unit 10A.

The second protrusion and recess portion 15 is a protrusion and recess unit forming a diffractive lens having the same action as a collimating lens and, more specifically, has a protrusion and recess structure having a predetermined protrusion and recess pattern exhibiting the above-described diffraction action of converting the divergence angle on incident light. More specifically, the protrusion and recess pattern is a two-dimensional pattern in a plan view of level differences or inclinations formed by protrusion parts or recess parts of the second protrusion and recess portion 15.

The protrusion and recess pattern of the second protrusion and recess portion 15 can also be obtained, for example, by Fourier-transforming a phase distribution of light exiting from the protrusion and recess pattern.

In this embodiment, the first protrusion and recess portion 12 and the second protrusion and recess portion 15 are sufficient if a desired phase distribution can be generated, and they are not limited to those having a structure of forming a protrusion and recess pattern on a surface of a transparent member such as glass or a resin. For example, those having a structure where a member differing in the refractive index from the transparent member is laminated on the top of the transparent member having a protrusion and recess pattern formed thereon such that the surface is flattened, or furthermore, those having a structure where the refractive index is varied in the transparent member, may also be employed. In other words, the protrusion and recess pattern as used herein does not mean only a structure where the surface profile is uneven but also encompasses all structures capable of giving a phase distribution to incident light.

In the following, the "downward" denotes a direction of getting closer to the substrate 14 with respect to the second protrusion and recess portion 15, and the "upward" denotes a direction of getting away from the substrate 14. Accordingly, out of top surfaces of each step of the second protrusion and recess portion 15, the surface closest to the substrate 14 is the lowermost surface, and the most distant surface is the uppermost surface.

Furthermore, in the following, with respect to a protrusion and recess pattern (a surface having a protrusion and recess-shaped cross-section formed on the substrate 14 surface by the second protrusion and recess portion 15), a portion located at a higher position than a portion located at a lowest position (first step s1 in the figure) is referred to as a protrusion part 151, and a portion that is a recess portion surrounded by protrusion parts 151 and located lower than the uppermost part of the protrusion part 151 is referred to as recess part 152. In addition, in the second protrusion and recess portion 15, the height of a portion actually generating a phase difference, more specifically, the distance from the top surface of first step s1 of the protrusion and recess pattern to the topmost part of the protrusion part 151, is referred to as a height d of the protrusion part 151 or a grating depth d. The height d of the protrusion part 151 may vary within the plane. Furthermore, in the first protrusion and recess portion 12, the protrusion part, the recess part, how to count the number of steps, handling of the height d of the protrusion part, and the later-described underlying layer, of the protrusion and recess pattern exhibiting a diffraction action, are basically the same as those described above.

Figure 2:
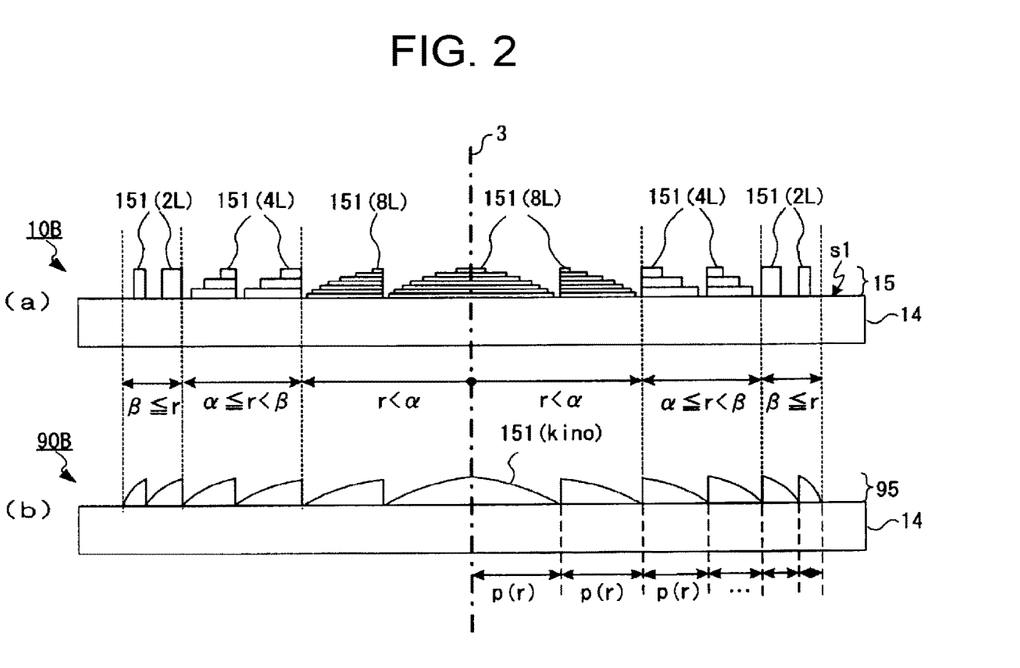
FIG. 2 is more detailed schematic cross-sectional diagrams of the lens unit 10B and the lens unit 90B of Comparative Example.

(a) of FIG. 2 is a more detailed schematic cross-sectional diagram of the lens unit 10B. As a comparative example of the lens unit 10B of this embodiment, (b) of FIG. 2 shows a schematic cross-sectional diagram of a lens unit 90B realizing a diffractive lens comparable to a collimating lens by using a kinoform.

As illustrated in (b) of FIG. 2, in the case where the protrusion and recess portion 95 of the lens unit 90B is a kinoform lens realizing a diffractive lens comparable to a collimating lens by using a kinoform, the lens surface is a curved surface shape having no plane perpendicular to incident light. More specifically, the cross-section of the lens surface is a periodic structure in which a relief shape is periodically repeated. The "cross-section" as used herein indicates a cross-section in a plane including an optical axis of incident light. In this case, the pitch p(r) of the relief shape is finer in the peripheral part, compared with the central part. This is because the light needs to change its traveling direction more in the peripheral part than in the central part. Here, r indicates a distance from the center (corresponding to the entering position of the optical axis 3 of incident light in the element).

As already described, the kinoform is encoded as a relief image such that the thickest portion on a kinoform is delayed by $2\pi$ [rad] in terms of phase angle compared with the thinnest portion. In this way, the height of the protrusion and recess portion 95 for realizing a kinoform is automatically determined by the refractive index of the protrusion and recess portion 95 member and the phase distribution intended to impart, and the pitch p(r) is determined accordingly.

In contrast, the second protrusion and recess portion 15 of this embodiment may be constituted by a periodic structure of a relief-protrusion portion that is a protrusion part having a relief-shaped cross-section like a kinoform lens, a periodic structure of a grating that has two or more steps and simulates the relief-protrusion portion, or a combination thereof. In this case, in the second protrusion and recess portion 15, the reproduction of the curved surface shape of the relief-protrusion portion surface is made rough at least in the peripheral portion distant from the center.

Here, the expression "reproduction of the curved surface shape of the surface is rough" indicates that the smoothness of the surface profile decreases. For example, instead of forming the curved surface shape of the surface as it is, the protrusion part is formed as a grating that has two or more steps and simulates the curved surface shape and at the same time, the number of steps is small. In this embodiment, an example where the pitch p(r) of the relief-protrusion portion is the same as the grating pitch of the second protrusion and recess portion 15 is described, but the pitch p(r) of the relief-protrusion portion need not always be equal to the grating pitch of the second protrusion and recess portion 15.

With respect to the reproduction of the curved surface shape of the surface, the second protrusion and recess portion 15 may include at least a grating having three or more steps disposed in the central part and a grating having two steps disposed in the peripheral part. The example illustrated in (a) of FIG. 2 is an example where the second protrusion and recess portion 15 is composed of a 8-level grating disposed in the central part, a 2-level grating disposed in the peripheral part, and a 4-level grating disposed in an annular zone part between the central part and the peripheral part. The number of steps of the grating is the number assuming the substrate 14 is a first step.

In this case, it may be possible to define the central part as a region where, for example, the distance r from the center is less than $\alpha$ and define the peripheral part as a region where, for example, the distance r from the center is $\beta$ or more (provided that $\alpha \geq \beta$). The annular zone part is defined as a region where the distance r from the center is a or more and less than $\beta$ (provided that $\alpha < B$). Here, $\alpha$ and $\beta$ can be simply determined based on the distance from the center but may also be determined based on, for example, the grating pitch of the protrusion part 151 or the value of diffraction efficiency or 0th-order efficiency in the wavelength band of incident light obtained as a result of simulation. The 0th-order efficiency here indicating the intensity of 0th-order light means a ratio of the amount of the transmitted 0th-order light exiting from the second protrusion and recess portion 15 to the total amount of light incident on the second protrusion and recess portion 15.

Figure 3:
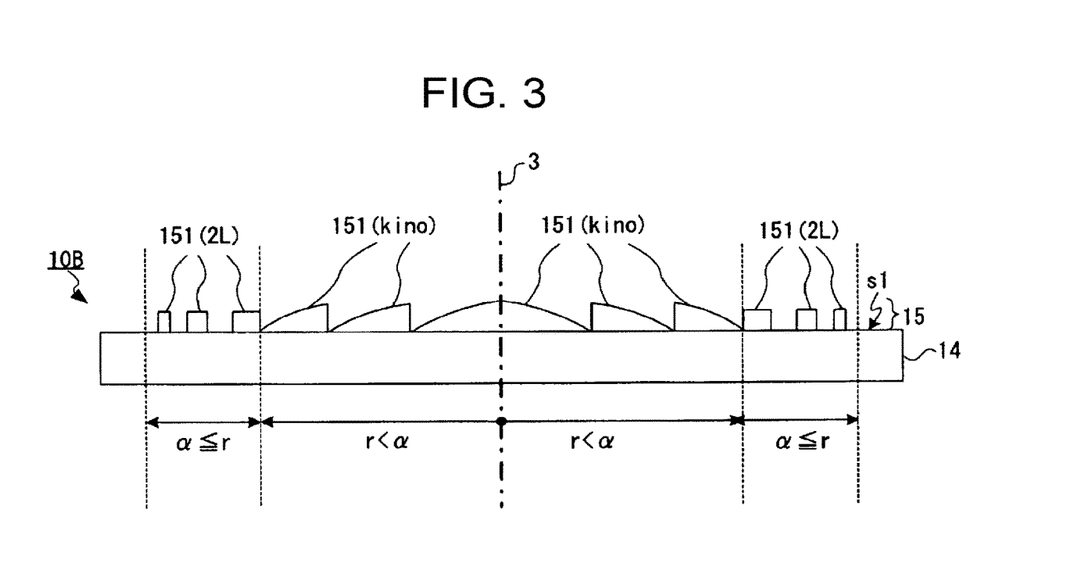
FIG. 3 is a schematic cross-sectional diagram illustrating another example of the lens unit 10B.

Also, FIG. 3 is a schematic cross-sectional diagram illustrating another example of the lens unit 10B. As illustrated in FIG. 3, the second protrusion and recess portion 15 may be composed of a kinoform disposed in the central part and a 2-level grating disposed in the peripheral part. In this case, it may be possible to define the central part as a region where, for example, the distance r from the center is less than $\alpha$, and define the peripheral part as a region where, for example, the distance r from the center is $\alpha$ or more.

As an example, a region where the grating pitch of the protrusion part 151 is less than a predetermined value may be defined as a peripheral part. In addition, for example, comparing the diffraction efficiencies in the wavelength band of incident light by 8-level, 4-level and 2-level gratings, when the distance from the center of a boundary where the grating pitch becomes a pitch not more than the pitch at which the diffraction efficiency in the wavelength band of incident light by the 4-level grating exceeds that by the 8-level grating is denoted as a and the distance from the center of a boundary where the grating pitch becomes a pitch not more than the pitch at which the diffraction efficiency in the wavelength band of incident light by the 2-level grating exceeds that by the 4-level grating is denoted as ß, it may be possible to define the central part as a region where the distance r from the center is less than $\alpha$ and define the peripheral part as a region where the distance r from the center is ß or more.

Furthermore, for example, comparing the 0th-order efficiencies in the wavelength band of incident light by 8-level, 4-level and 2-level gratings, the distance from the center of a boundary where the grating pitch becomes a pitch not more than the pitch at which the 0th-order efficiency in the wavelength band of incident light by the 4-level grating falls below that by the 8-level grating may be defined as $\alpha$, and the distance from the center of a boundary where the grating pitch becomes a pitch not more than the pitch at which the 0th-order efficiency in the wavelength band of incident light by the 2-level grating falls below that by the 4-level grating may be defined as $\beta$. Also, for example, comparing the diffraction efficiencies in the wavelength band of incident light by a kinoform and a 2-level grating, the distance from the center of a boundary where the grating pitch becomes a pitch not more than the pitch at which the diffraction efficiency in the wavelength band of incident light by the 2-level grating exceeds that by the kinoform may be defined as a. In addition, comparing the 0th-order efficiencies in the wavelength band of incident light by a kinoform and a 2-level grating, the distance from the center of a boundary where the grating pitch becomes a pitch not more than the pitch at which the 0th-order efficiency in the wavelength band of incident light by the 2-level grating falls below that by the kinoform may be defined as a.

Note that although the examples above are examples where the effective region is divided into respective regions in which two kinds or three kinds of protrusion parts are disposed, but the kind of the protrusion part is not limited to two kinds or three kinds. For example, at each grating pitch, a protrusion part having a highest diffraction efficiency or having a lowest 0th-order efficiency, or a protrusion part of which overall evaluation based on these two indices is highest may be selected.

Figure 4A:
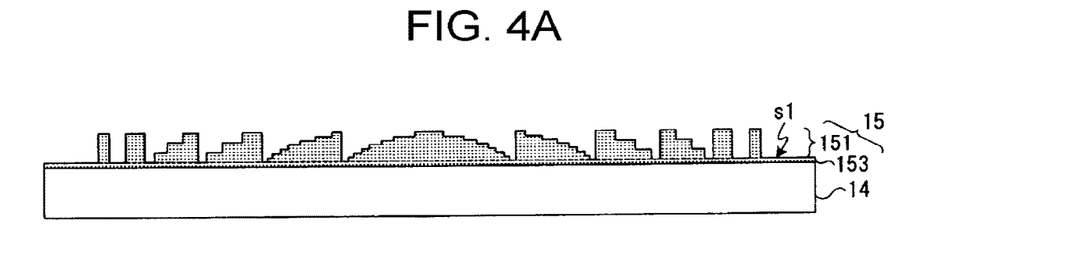
FIG. 4A and FIG. 4B are schematic cross-sectional diagrams illustrating another example of the lens unit 10B.
Figure 4B:
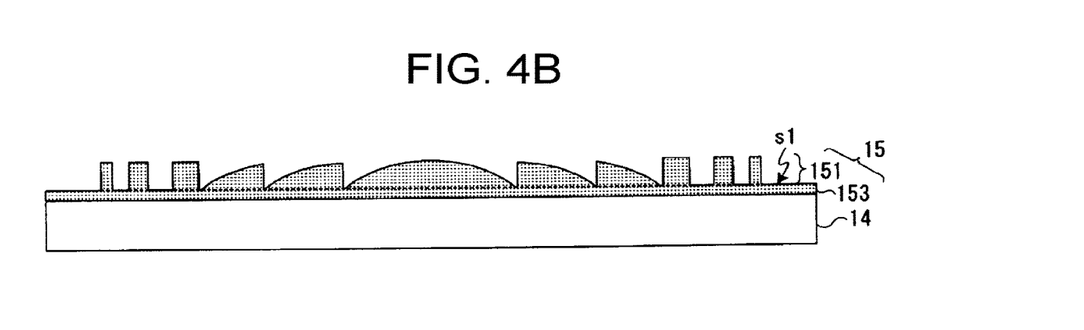

In addition, FIG. 4A and FIG. 4B are schematic cross-sectional diagrams illustrating other examples of the lens unit 10B. As illustrated in FIG. 4A and FIG. 4B, the second protrusion and recess portion 15 may include an area not generating a phase difference (in FIG. 4A and FIG. 4B, a layer covering the surface of the substrate 14 and constituting a first step s1). In this case, the area is sometimes referred to as an underlying layer 153. In the case where the second protrusion and recess portion 15 includes an underlying layer, the thickness of the second protrusion and recess portion 15, that is, the total thickness including the underlying layer 153 as a member forming the second protrusion and recess portion 15, is preferably 4 μm or less, more preferably 2 μm or less. Also, the thickness of the second protrusion and recess portion 15 is preferably 0.2 μm or more.

Figure 5:
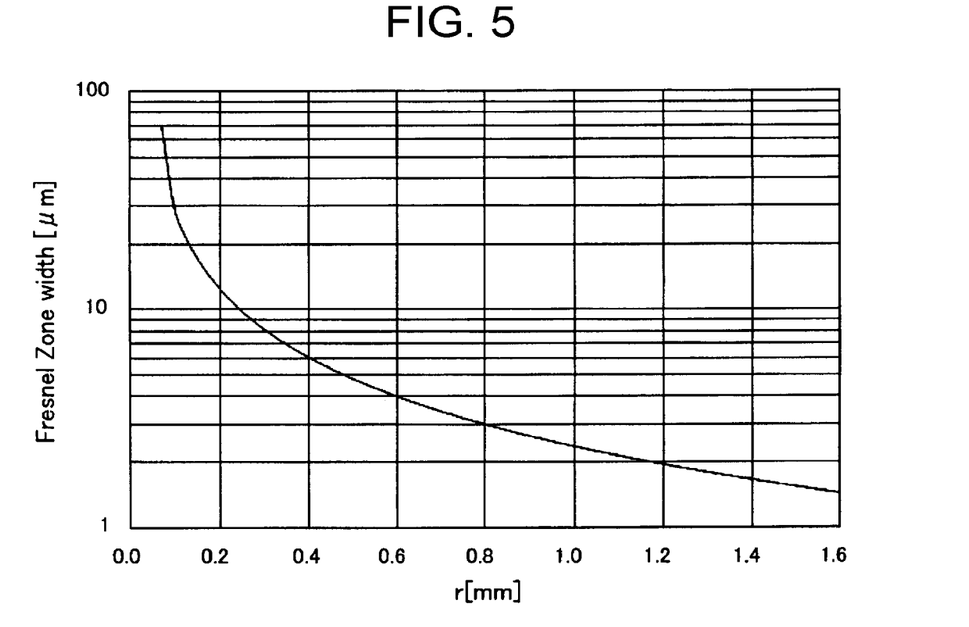
FIG. 5 is a graph illustrating the relationship between the distance r from the center of the second protrusion and recess portion 15 entirely constituted by a kinoform and the Fresnel zone width of the protrusion part 151.

Furthermore, FIG. 5 is a graph illustrating the relationship between the distance r from the center of the second protrusion and recess portion 15 entirely constituted by a kinoform and the Fresnel zone width (corresponding to the pitch p(r)) of the protrusion part 151. The relationship illustrated in FIG. 5 between r and the Fresnel zone width is an example in a kinoform lens equivalent to a diffractive lens of converting incident light having a divergence angle of 30° and a wavelength of 850 nm into parallel light.

From the example illustrated in FIG. 5, it is understood that as it is farther from the center, the Fresnel zone width of the protrusion part 151 decreases. Incidentally, depending on the spherical shape, for example in aspherical lens, the Fresnel zone width of the protrusion part 151 is not necessarily smaller as is farther from the center and may partially increase.

Figure 6:
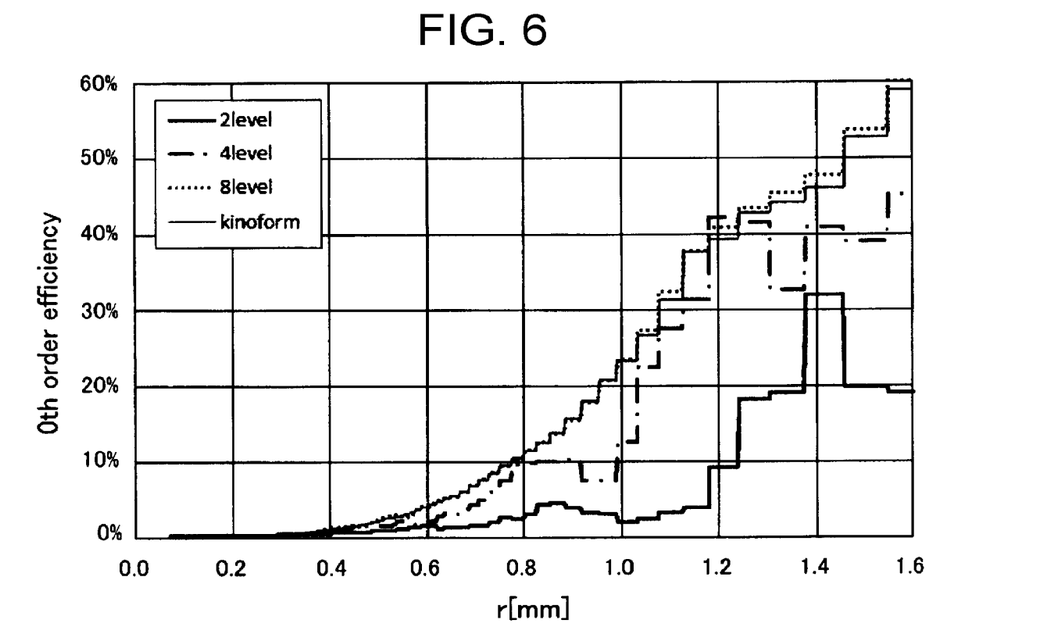
FIG. 6 is a graph illustrating the 0th-order efficiency by each of the kinoform lens illustrated in FIG. 5 and comparable three diffractive lenses (8-level, 4-level, 2-level).
Figure 7:
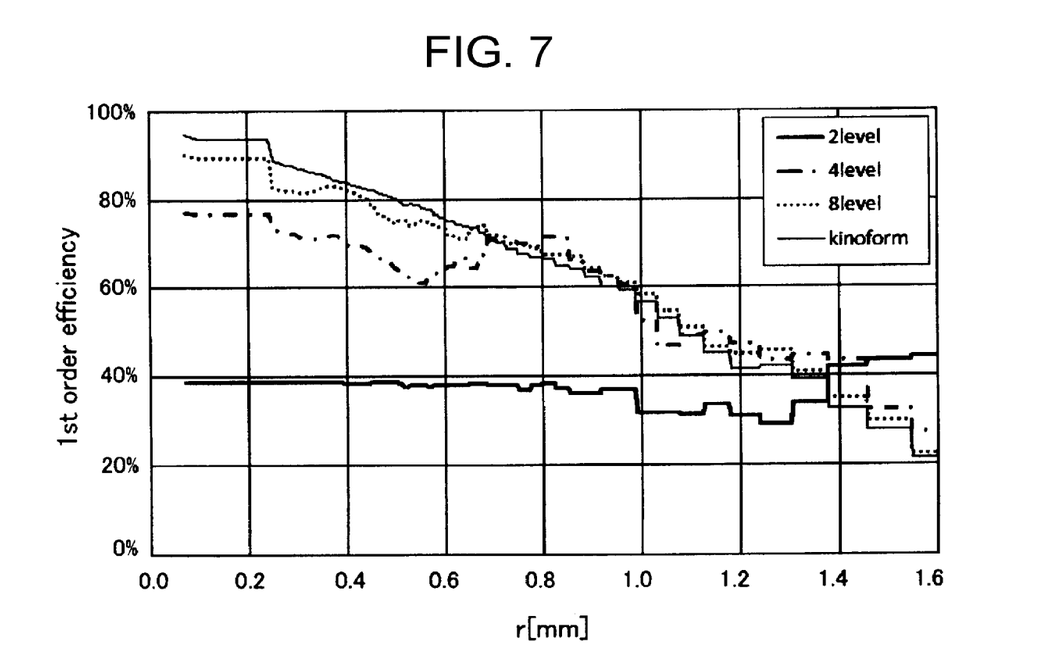
FIG. 7 is a graph illustrating the diffraction efficiency of 1st-order diffracted light by each of the kinoform lens illustrated in FIG. 5 and comparable three diffractive lenses (8-level, 4-level, 2-level).

In addition, FIG. 6 and FIG. 7 are graphs respectively illustrating the 0th-order efficiency and the diffraction efficiency of 1st-order diffracted light by each of the kinoform lens illustrated in FIG. 5 and comparable diffractive lenses (8-level, 4-level, 2-level). The 0th-order efficiency and the diffraction efficiency of 1st-order diffracted light are here calculated by a rigorous coupled-wave analysis (RCWA).

According to FIG. 6, it is seen that in the case of a kinoform or a 8-level grating, as the distance r from the center increase, i.e., as the pitch p(r) decreases, the 0th-order efficiency increases, but in the case of a 4-level or 2-level grating, when the distance r from the center is equal to or more than a certain value, i.e., the pitch p(r) is equal to or less than a certain value, the 0th-order efficiency rise rate settles and converges to a certain value. In the case illustrated in FIG. 6, for example, the peripheral part may be defined as a region where r≥1.2 mm at which the 0th-order efficiency of a 4-level or 2-level grating settles and a 2-level or 4-level grating may be disposed in the peripheral part, and the central part may be defined as a region other than the peripheral part and a 8-level grating or a kinoform may be disposed in the central part.

In addition, according to FIG. 7, it is seen that in the case of a kinoform or a 8-step grating, although the diffraction efficiency of 1st-order diffracted light is high around the center, as the distance r from the center increases, i.e., as the pitch p(r) decreases, the diffraction efficiency of 1 st-order diffracted light decreases and moreover, the drop rate thereof is large, and in the case of a 4-level grating, the diffraction efficiency around the center is inferior to the kinoform or a 8-level grating, but the drop rate thereof is relatively moderate. It is also seen that in the case of a 2-level grating, the diffraction efficiency of 1st-order diffracted light is substantially constant irrespective of the distance r. In the case illustrated in FIG. 7, the following configuration may be employed: the central part is defined as a region of distance r<0.7 mm where the diffraction efficiency of 1st-order diffracted light by a kinoform or 8-level grating is higher than that by a 4-level or 2-level grating, and a kinoform or a 8-level grating is disposed therein; the annular zone part is defined as a region of 0.7 mm≤distance r<1.4 mm where the diffraction efficiency of 1st-order diffracted light is substantially the same among a kinoform and 8-level and 4-level gratings, and a 4-level grating is disposed therein; and the peripheral part is defined as a region of distance r≥1.4 mm where the diffraction efficiency of 1st-order diffracted light by a 2-level grating is higher than those by other gratings, and a 2-level grating is disposed therein.

The above-described configuration makes it possible to reduce the 0th-order efficiency by the second protrusion and recess portion 15 in the wavelength band of incident light to 35% or less in the entire effective region. It is also possible to increase the diffraction efficiency by the second protrusion and recess portion 15 to 30% or more in the entire effective region. The second protrusion and recess portion 15 is preferably configured such that the 0th-order efficiency in the wavelength band of incident light is 40% or less in the entire effective region. The 0th-order efficiency is more preferably 30% or less, still more preferably 20% or less. In addition, the second protrusion and recess portion 15 is preferably configured such that the diffraction efficiency in the wavelength band of incident light is 20% or more in the entire effective region. Also, the diffraction efficiency is more preferably 30% or more, still more preferably 40% or more.

In the example above, the region is divided based on the distance r, but when the value of the distance r is converted to the pitch p(r) on the basis of the graph illustrated in FIG. 5, this can be regarded as the region division based on the pitch p(r). The second protrusion and recess portion 15 may be a protrusion and recess pattern having a minimum pitch of 5 μm or less or 2 μm or less. Even in the case of having such a fine pitch, when the reproduction of the curved surface shape of the surface particularly in the peripheral part is made rough, not only the processing difficulty can be avoided but also reduction in the 0th-order efficiency or enhancement of the diffraction efficiency can be achieved. Note that the second protrusion and recess portion 15 may be a protrusion and recess pattern having a minimum pitch of 0.5 μm or more.

Figure 8:
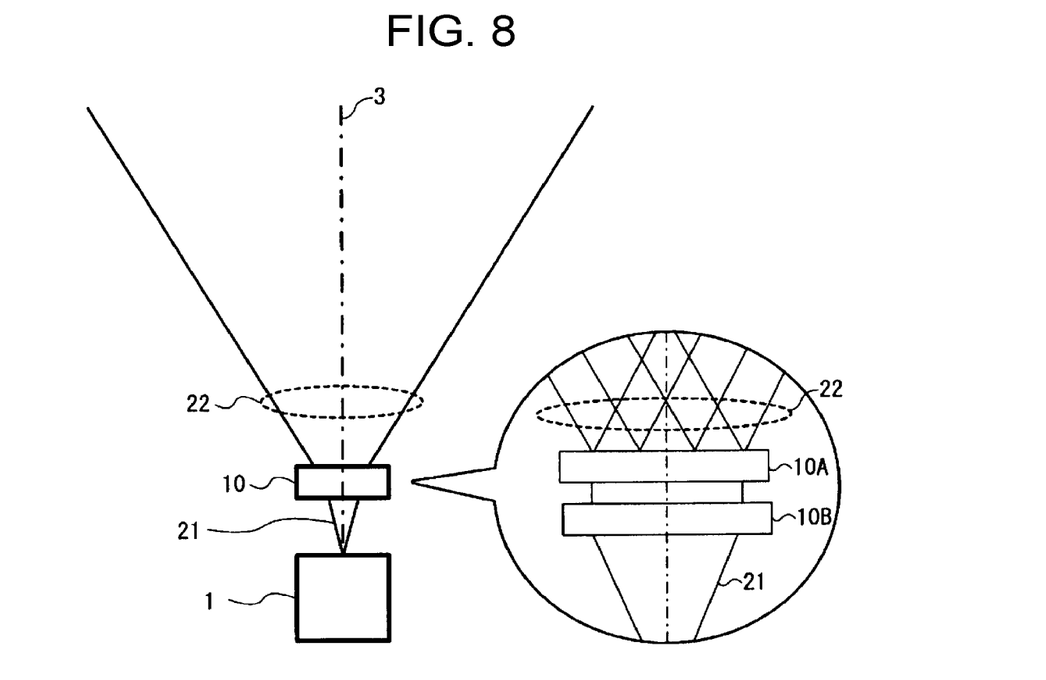
FIG. 8 is an explanatory diagram illustrating a configuration example of an illumination optical system utilizing the diffractive optical element 10.
Figure 9:
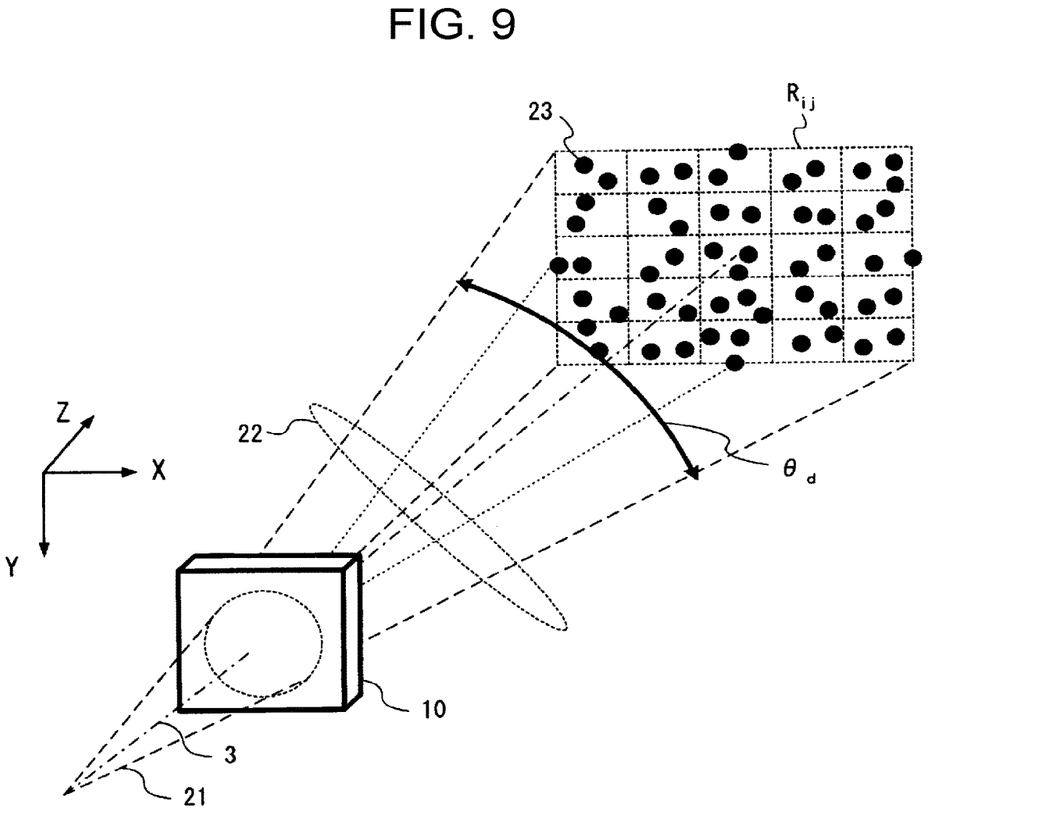
FIG. 9 is an explanatory diagram illustrating a configuration example of an illumination optical system utilizing the diffractive optical element 10.

Next, an illumination optical system using the diffractive optical element 10 of this embodiment is described by referring to FIG. 8 and FIG. 9. The illumination optical system illustrated in FIG. 8 includes a light source 1 and a diffractive optical element 10.

The light source 1 emits scattered light 21. The scattered light 21 emitted from the light source 1 is incident on the diffractive optical element 10, is split into diffracted light, i.e., a plurality of parallel lights (a diffracted light group 22 in the figure), and exits. At this time, in the diffractive optical element 10, first, the incident scattered light 21 is converted into parallel light by the lens unit 10B and then split into diffracted light, i.e., a plurality of parallel lights, by the diffraction unit 10A. As a result, the scattered light 21 incident on the diffractive optical element 10 exits as a diffracted light group 22 for forming a predetermined light pattern on a predetermined projection surface.

Next, the diffraction action the diffraction unit 10A and the lens unit 10B of the diffractive optical element 10 exhibit is described based on an example of the light pattern generated by the diffractive optical element 10 by reference to FIG. 9. The diffractive optical element 10 is formed such that a diffracted light group 22 to exit is distributed two-dimensionally relative to the light flux (scattered light 21) having a predetermined divergence angle and being incident, with the optical axis direction being the Z axis. Assuming the axes having an intersection with Z axis and being perpendicular to the Z axis and mutually orthogonal with each other are X axis and Y axis, the diffraction unit 10A of the diffractive optical element 10 distributes the diffracted light group 22 in an angular range from a minimum angle $\theta x_{min}$ to a maximum angle $\theta x_{max}$ on the X axis and from a minimum angle $\theta y_{min}$ to a maximum angle $\theta y_{max}$ (all angles are not shown in the figure) on the Y axis.

Here, the X axis is substantially parallel to the long side of a light spot pattern and the Y axis is substantially parallel to the short side of a light spot pattern. The irradiation range irradiated with the diffracted light group 22 and formed by a range from the minimum angle $\theta x_{min}$ to the maximum angle $\theta x_{max}$ in the X-axis direction and a range from the minimum angle $\theta y_{min}$ to the maximum angle $\theta y_{max}$ in the Y-axis direction is a range substantially coinciding with a light detection range in a photodetection element used together with the diffractive optical element 10. In this example, in the light spot pattern, a straight line which passes through a light spot having an angle of $\theta x_{max}$ in the X direction relative to the Z axis and which is parallel to the Y axis is the above-described short side and a straight line which passes through a light spot having an angle of $\theta y_{max}$ in the Y direction relative to the Z axis and which is parallel to the X axis is the above-described long side. Hereinafter, the angle subtended between an intersection point of the short side with the long side and another diagonal intersection point is denoted as $\theta_d$, and this angle is referred to as an angle in the diagonal direction. Here, the angle $\theta_d$ in the diagonal direction (hereinafter, referred to as a diagonal field of view $\theta_d$) is set equal to an exit angle range $\theta_{out}$ of the diffractive optical element 10. The exit angle range $\theta_{out}$ is an angular range indicating an expanse of a light pattern formed by diffracted light output from the first protrusion and recess portion 12 when incident light is incident from the normal direction of the substrate 14. Here, the exit angle range $\theta_{out}$ of the diffractive optical element 10 may be set equal to, for example, a maximum value of an angle formed by two light spots included in the diffracted light group 22, instead of setting it equal to the diagonal field of view $\theta_d$.

In the diffractive optical element 10, for example, the exit angle range $\theta_{out}$ when incident light is incident from the normal direction of the surface of the substrate 14 is preferably 70° or more. For example, some camera devices installed in a smartphone, etc. have an angle of view (full angle) of approximately from 50° to 90°. In addition, some LIDAR devices used for autonomous driving, etc. have a field of view of approximately from 30° to 70°. Furthermore, the human field of view is generally about 120°, and some camera devices of a VR headset, etc. have realized a field of view of 70° to 140°. In order to apply the diffractive optical element 10 to these devices, the exit angle range $\theta_{out}$ of the diffractive optical element 10 may be 100° or more, or 120° or more.

In addition, the number of light spots generated by the diffractive optical element 10 may be 4 or more, 9 or more, 100 or more, or 10,000 or more. Here, the upper limit of the number of light spots is not particularly limited but may be, for example, 10,000,000.

In FIG. 9, $R_{ij}$ indicates a divided region of the projection surface. For example, the diffractive optical element 10 may be configured such that when the projection surface is divided into a plurality of regions $R_{ij}$, the distribution density of light spots 23 formed by the diffracted light group 22 applied to respective regions $R_{ij}$ is within +50% of an average value of all regions. The distribution density may be within +25% of an average value of all regions. This configuration is suitable for a measurement purpose, etc., because the distribution of light spots 23 in the projection surface can be made uniform. Here, the projection surface may be not only a flat surface but also a curved surface. In addition, even in the case of a flat surface, the surface may not only be perpendicular to but also be inclined with respect to the optical axis of the optical system.

Each diffracted light included in the diffracted light group 22 illustrated in FIG. 9 is light diffracted, in grating equations (1), by an angle $\theta_{xo}$ in the X direction and an angle $\theta_{yo}$ in the Y direction with respect to the Z-axis direction. In equations (1), $m_x$ is the order of diffraction in the X direction, $m_y$ is the order of diffraction in the Y direction, $\lambda$ is the wavelength of an incident light flux, $P_x$ and $P_y$ are respectively pitches in the X-axis direction and the Y-axis direction of the first protrusion and recess portion 12 included in the diffraction unit 10A, $\theta_{xi}$ is an incident angle (in this example, 90°) on the first protrusion and recess portion 12 in the X direction, and $\theta_{xi}$ is an incident angle (in this example, 90°) on the first protrusion and recess portion 12 in the Y direction. When the diffracted light group 22 is applied to the projection surface such as screen, measurement target object, etc., a plurality of light spots 23 are generated in the irradiated area.

$$\sin \theta_{xo} = \sin \theta_{xi} + m_x \lambda / P_x$$

$$\sin \theta_{yo} = \sin \theta_{yi} + m_y \lambda / P_y \quad (1)$$

In the case where the first protrusion and recess portion 12 has an N-level stepwise quasi-blazed shape, it is preferable to satisfy $\Delta nd/\lambda = (N-1)/N$, because the optical path length difference produced by the first protrusion and recess portion 12 can be made to approximate a wavefront of one wavelength portion and thus a high diffraction efficiency is obtained.

In addition, although not shown in the drawings, the illumination optical system including the diffractive optical element 10 may be used for a projection device for applying a predetermined light pattern to a measurement target. One example of the utilization of such a projection device is a measurement device including the projection device and a detection unit configured to detect scattered light generated when light exiting from the projection device is applied to a measurement target object.

Figure 10:
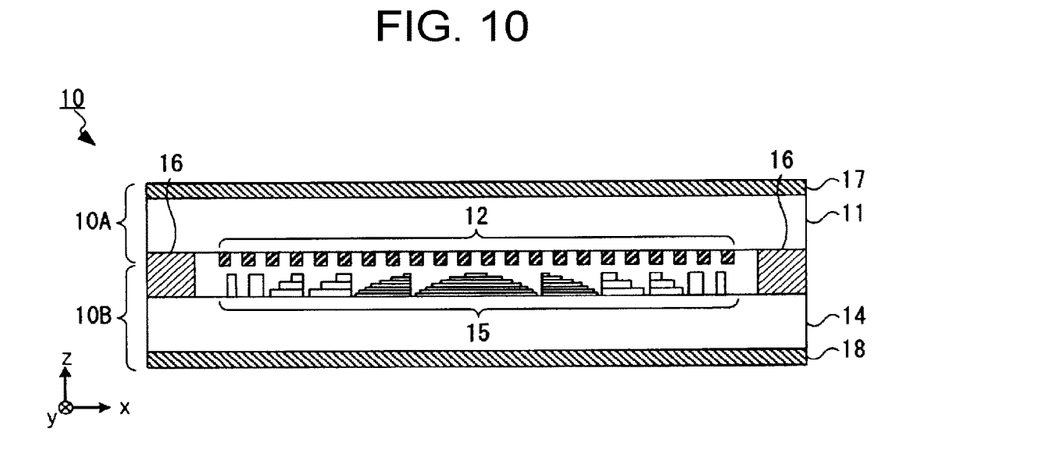
FIG. 10 is a schematic cross-sectional diagram illustrating another example of the diffractive optical element 10.

Also, FIG. 10 is a schematic cross-sectional diagram illustrating another example of the diffractive optical element 10. As illustrated in FIG. 10, in the diffractive optical element 10, a diffraction unit 10A having a first protrusion and recess portion 12 formed on a substrate 11 and a lens unit 10B having a second protrusion and recess portion 15 formed on a substrate 14 may be integrated by laminating the substrate 11 and the substrate 14 together without the intervention of a substrate 13.

In addition, antireflection layers 17 and 18 may be provided on the light incident-side outermost surface and light exit-side outermost surface of the diffractive optical element 10.

In a configuration including these layers, the height of the protrusion part 151 of the protrusion and recess pattern is also preferably 4 μm or less, more preferably 2 μm or less.

Figure 11:
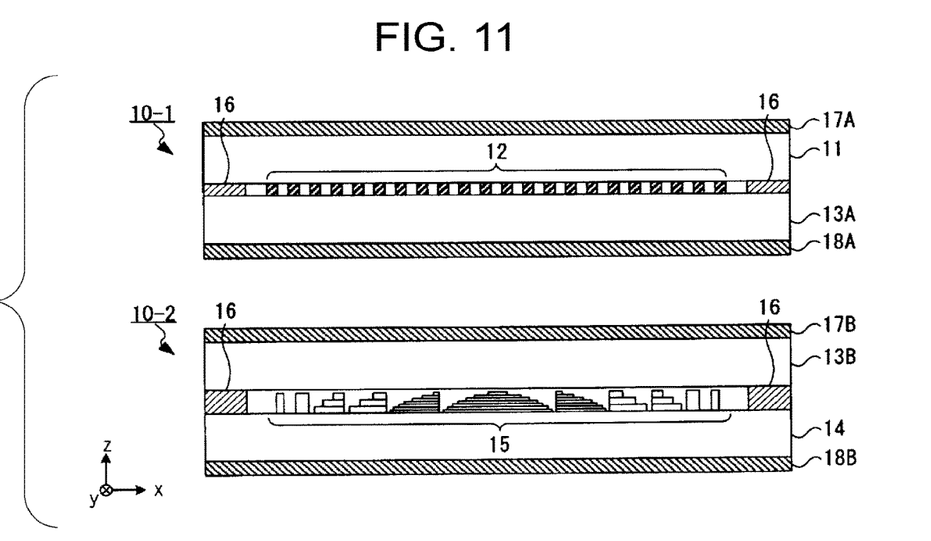
FIG. 11 is a schematic cross-sectional diagram illustrating another example of the diffractive optical element 10.

In the description above, a diffractive optical element 10 in which the diffraction unit 10A and the lens unit 10B are integrated is illustrated by an example, but it is also possible to constitute the diffraction unit 10A and the lens unit 10B as separated elements (see FIG. 11). In this case, the configuration is not particularly limited as long as a second diffractive optical element 10-2 acting as the lens unit 10B and including at least a second protrusion and recess portion 15 is disposed on the light incident side of a first diffractive optical element 10-1 acting as the diffraction unit 10A and including at least a first protrusion and recess portion 12. In the example illustrated in FIG. 11, the first diffractive optical element 10-1 includes a first protrusion and recess portion 12 between a substrate 11 and a substrate 13A and furthermore, antireflection layers 17A and 18A are provided on the light incident-side outermost surface and light exit-side outermost surface of the first diffractive optical element 10-1. In addition, the second diffractive optical element 10-2 includes a second protrusion and recess portion 15 between a substrate 13B and a substrate 14 and furthermore, antireflection layers 17B and 18B are provided on the light incident-side outermost surface and light exit-side outermost surface of the second diffractive optical element 10-2.

The antireflection layers 17, 18, 17A, 17B, 18A, and 18B are not particularly limited as long as they have an antireflection function of lowering the reflectance of at least light having a designed wavelength at the interface on the exit side or incident side of the diffractive optical element 10, but examples of the antireflection layer include a thin film having a single layer structure, and a multilayer film such as a dielectric multilayer film.

Ex. 1

This example is an example of the diffractive optical element 10 illustrated in FIG. 10. In this example, the configuration illustrated in FIG. 4A is employed as the configuration of the second protrusion and recess portion 15. In addition, the designed wavelength is 850 nm. Furthermore, the first protrusion and recess portion 12 is a 2-level protrusion and recess pattern for generating a total of 961 light spots, i.e., 31 points in the X direction and 31 points in the Y direction, the grating in the protrusion and recess pattern is in a regular array, and separation angles between all pairs of adjacent light spots are the same. Also, the second protrusion and recess portion 15 has a protrusion and recess pattern constituted by a combination of 8-level, 4-level and 2-level gratings so that incident light at a divergence angle of 30° can be converted into parallel light. Moreover, a glass substrate having a refractive index of 1.51 and a thickness of 0.5 mm is used for the material of the substrates 11 and 14, and $SiO_2$ having a refractive index of 1.45 is used for the material of the first protrusion and recess portion 12 and second protrusion and recess portion 15. The specific configuration of the diffractive optical element 10 of this example is shown in Table 1.

TABLE 1

| Configuration | | Material | Refractive Index | Thickness [nm] |
|---|---|---|---|---|
| Antireflection layer | | $SiO_2$ | 1.45 | 172 |
| | | $Ta_2O_5$ | 2.19 | 67 |
| | | $SiO_2$ | 1.45 | 42 |
| | | $Ta_2O_5$ | 2.19 | 18 |
| | | $SiO_2$ | 1.45 | 35 |
| | | $Ta_2O_5$ | 2.19 | 18 |
| Substrate | | borosilicate glass | 1.51 | — |
| First protrusion and recess portion | Underlying layer | $SiO_2$ | 1.45 | 100 |
| | Protrusion part | $SiO_2$ | 1.45 | 2-level: 944 (one step 944 × 1) |
| | gap | air | 1 | 30000 |
| Second protrusion and recess portion | Protrusion part | $SiO_2$ | 1.45 | 8-level: 1652 (one step 236 × 7) 4-level: 1416 (one step 472 × 3) 2-level: 944 (one step 944 × 1) |
| | Underlying layer | $SiO_2$ | 1.45 | 100 |
| Substrate | | borosilicate glass | 1.51 | — |
| Antireflection layer | | $Ta_2O_5$ | 2.19 | 18 |
| | | $SiO_2$ | 1.45 | 35 |
| | | $Ta_2O_5$ | 2.19 | 18 |
| | | $SiO_2$ | 1.45 | 42 |
| | | $Ta_2O_5$ | 2.19 | 67 |
| | | $SiO_2$ | 1.45 | 172 |

In addition, in the above, the intensity of 0th-order light (0th-order efficiency) of the lens unit 10B and the diffraction efficiency of the 1st-order diffracted light are calculated by a rigorous coupled-wave analysis (RCWA). However, the 0th-order efficiency and diffraction efficiency in the entire diffractive optical element 10 may also be determined by the same methods to evaluate the element as a whole. The 0th-order efficiency of the entire element is preferably 0.5% or less in view of laser safety and more preferably 0.1% or less. Besides the calculation by RCWA, the 0th-order efficiency in the entire diffractive optical element 10 can also be evaluated by making laser light having a designed wavelength and a predetermined divergence angle be incident on the diffractive optical element 10 and measuring the amount of linear transmitted light.

First, the diffraction unit 10A is prepared. An antireflection layer 17 that is a 6-layer dielectric multilayer film composed of $SiO_2$ and $Ta_2O_5$ is deposited on one surface of a glass substrate used as the substrate 11. The material and thickness of each layer are as shown in Table 1.

Subsequently, $SiO_2$ as the material of the first protrusion and recess portion 12 is deposited on the glass substrate surface opposite to the surface on which the antireflection layer has been deposited, and the $SiO_2$ film is processed into a 2-level protrusion and recess structure by photolithography and etching (reactive ion etching). In the protrusion and recess structure, the height of the protrusion part is 944 nm, and the thickness of the second protrusion and recess portion 15 including the underlying layer is 1,044 nm.

Next, the lens unit 10B is prepared. An antireflection layer 18 that is a 6-layer dielectric multilayer film composed of $SiO_2$ and $Ta_2O_5$ is deposited on one surface of a glass substrate used as the substrate 14. The material and thickness of each layer are as shown in Table 1.

Subsequently, $SiO_2$ as the material of the second protrusion and recess portion 15 is deposited on the glass substrate surface opposite to the surface on which the antireflection layer has been deposited, and the $SiO_2$ film is processed into a protrusion and recess structure including 8-level grating in the central part, a 4-level grating in the annular zone part, and a 2-level grating in the peripheral part by photolithography and etching (reactive ion etching).

The processing step into a protrusion and recess structure is as follows. First, a resist mask according to the protrusion and recess pattern of the second protrusion and recess portion 15 is formed on the deposited $SiO_2$ film by using photolithography. Subsequently, reactive ion etching (processing amount: 236 nm) where a non-covered portion in which the pattern is not covered is etched by 236 nm in the vertical direction is performed to form a part of the protrusion part 151. After the etching, the remaining resist mask is removed.

The above-described resist mask formation, etching processing and resist mask removal steps are repeated with different processing amounts (second processing amount: 472 nm, third processing amount: 944 nm). Thus, a stepwise protrusion and recess structure serving as the second protrusion and recess portion 15 is obtained. At this time, the region where the 8-level grating is formed is a region of r<0.6 mm (the range of the pitch p(r) being 4 µm or more), the region where the 4-level grating is formed is a region of 0.6 mm≤r<1.2 mm (the range of the pitch p(r) being from 4 µm to 2 µm), and the region where the 2-level grating is formed is a region of r≥1.2 mm (the range of the pitch p(r) being 2 µm or less).

Finally, the substrate 11 and the substrate 14 are stacked by arranging the first protrusion and recess portion 12 and the second protrusion and recess portion 15 to face each other. For example, a seal pattern having a height of 30 µm and using a UV adhesive is formed by screen printing at the outside of the frame of a substrate 14 surface where the second protrusion and recess portion 15 is formed. Subsequently, the substrate 11 on which the first protrusion and recess portion 12 has been formed is stacked on the substrate 14 by arranging the first protrusion and recess portion 12 to face inward, and the stack is irradiated with UV to bond both substrates.

In this way, the diffractive optical element 10 of this example is obtained. In the thus-obtained diffractive optical element 10, the height of the protrusion part 151 of the protrusion and recess pattern is 2 µm or less, the diffraction efficiency at the wavelength band of incident light satisfies 40% or more in the entire effective region, and the 0th-order efficiency satisfies 35% or less in the entire effective region.

Ex. 2

This example is an example of the diffractive optical element 10 illustrated in FIG. 10. In this example, the configuration illustrated in FIG. 4B is employed as the configuration of the second protrusion and recess portion 15. The configuration of the diffractive optical element is the same as that of Ex. 1 except that the configuration of the second protrusion and recess portion 15 is different. The specific configuration of the diffractive optical element 10 of this example is shown in Table 2.

TABLE 2

| Configuration | | Material | Refractive Index | Thickness [nm] |
|---|---|---|---|---|
| Antireflection layer | | $SiO_2$ | 1.45 | 172 |
| | | $Ta_2O_5$ | 2.19 | 67 |
| | | $SiO_2$ | 1.45 | 42 |
| | | $Ta_2O_5$ | 2.19 | 18 |
| | | $SiO_2$ | 1.45 | 35 |
| | | $Ta_2O_5$ | 2.19 | 18 |
| Substrate | | borosilicate glass | 1.51 | — |
| First protrusion and recess portion | Underlying layer | $SiO_2$ | 1.45 | 100 |
| | Protrusion part | $SiO_2$ | 1.45 | 2-level: 944 (one step 944 × 1) |
| | gap | air | 1 | 30000 |
| Second protrusion and recess portion | Protrusion part | $SiO_2$ | 1.45 | kinoform: 1889 2-level 944 (one step 944 × 1) |
| | Underlying layer | $SiO_2$ | 1.45 | 100 |
| Substrate | | borosilicate glass | 1.51 | — |
| Antireflection layer | | $Ta_2O_5$ | 2.19 | 18 |
| | | $SiO_2$ | 1.45 | 35 |
| | | $Ta_2O_5$ | 2.19 | 18 |
| | | $SiO_2$ | 1.45 | 42 |
| | | $Ta_2O_5$ | 2.19 | 67 |
| | | $SiO_2$ | 1.45 | 172 |

In this example as well, first, the diffraction unit 10A is prepared. Incidentally, the diffraction unit 10A is the same as that of Ex. 1 and therefore, its description is omitted.

Next, the lens unit 10B is prepared. The same antireflection layer 18 as that of Ex. 1 is deposited on one surface of a glass substrate used as the substrate 14. The material and thickness of each layer are as shown in Table 2.

Subsequently, $SiO_2$ as the material of the second protrusion and recess portion 15 is deposited on the glass substrate surface opposite to the surface on which the antireflection layer has been deposited, and the $SiO_2$ film is processed into a protrusion and recess structure including a kinoform in the central part and a 2-level grating in the peripheral part by photolithography and etching (reactive ion etching).

The processing step into a protrusion and recess structure is as follows. First, a grayscale resist mask according to the protrusion and recess pattern of kinoform of the second protrusion and recess portion 15 is formed in a region corresponding to the central part in which the kinoform is to be formed on the deposited SiO$_2$ film, by using photolithography.

Subsequently, the formed resist mask is subjected to reactive ion etching (maximum processing amount: 1,889 nm) where a non-covered portion in which the pattern is not covered is etched by up to 1,889 nm in the vertical direction to form a portion of the protrusion part 151. After the etching, the remaining resist mask is removed.

Thereafter, a resist mask according to the protrusion and recess pattern of a 2-level grating of the second protrusion and recess portion 15 is formed, on the SiO$_2$ film, in a region corresponding to the peripheral part in which a 2-level grating is formed, by using photolithography. Subsequently, the formed resist mask is subjected to reactive ion etching (processing amount: 944 nm) where the non-covered portion in which the pattern is not covered is etched by 944 nm in the vertical direction to form a part of the protrusion part 151. After the etching, the remaining resist mask is removed. Thus, a stepwise protrusion and recess structure serving as the second protrusion and recess portion 15 is obtained. In this case, the region where the kinoform is formed is a region of r<1.2 mm (the range of the pitch p(r) being 2 µm or more), and the region where the 2-level grating is formed is a region of r≥1.2 mm (the range of the pitch p(r) being 2 µm or less).

Finally, the substrate 11 and the substrate 14 are stacked by arranging the first protrusion and recess portion 12 and the second protrusion and recess portion 15 to face each other. The stacking method is the same as that of Ex. 1. In this way, the diffractive optical element 10 of this example is obtained.

In the thus-obtained diffractive optical element 10, the height of the protrusion part 151 of the protrusion and recess pattern is 2 µm or less, the diffraction efficiency at the wavelength band of incident light satisfies 40% or more in the entire effective region, and the 0th-order efficiency satisfies 40% or less in the entire effective region.

Comparative Example 1

This example is Comparative Example, and in the diffractive optical element 10 illustrated in FIG. 10, the element is configured to include, in place of the second protrusion and recess portion 15, a protrusion and recess portion 95 entirely composed of a kinoform as illustrated in FIG. 12. The configuration of the element is the same as that of Ex. 1 and Ex. 2 except that the configuration of the second protrusion and recess portion 15 is different. The specific configuration of the diffractive optical element 10 of this example is shown in Table 3.

TABLE 3

| Configuration | | Material | Refractive Index | Thickness [nm] |
|---|---|---|---|---|
| Antireflection layer | | SiO$_2$ | 1.45 | 172 |
| | | Ta$_2$O$_5$ | 2.19 | 67 |
| | | SiO$_2$ | 1.45 | 42 |
| | | Ta$_2$O$_5$ | 2.19 | 18 |
| | | SiO$_2$ | 1.45 | 35 |
| | | Ta$_2$O$_5$ | 2.19 | 18 |
| Substrate | | borosilicate glass | 1.51 | — |
| First protrusion and recess portion | Underlying layer | SiO$_2$ | 1.45 | 100 |
| | Protrusion part | SiO$_2$ | 1.45 | 2-level: 944 (one step 944 × 1) |
| gap | | air | 1 | 30000 |
| Second protrusion and recess portion | Protrusion part | SiO$_2$ | 1.45 | kinoform: 1889 |
| | Underlying layer | SiO$_2$ | 1.45 | 100 |
| Substrate | | borosilicate glass | 1.51 | — |
| Antireflection layer | | Ta$_2$O$_5$ | 2.19 | 18 |
| | | SiO$_2$ | 1.45 | 35 |
| | | Ta$_2$O$_5$ | 2.19 | 18 |
| | | SiO$_2$ | 1.45 | 42 |
| | | Ta$_2$O$_5$ | 2.19 | 67 |
| | | SiO$_2$ | 1.45 | 172 |

In this example as well, first, the diffraction unit 10A is prepared. The diffraction unit 10A is the same as that of Ex. 1 and therefore, its description is omitted.

Next, the lens unit 90B is prepared. The same antireflection layer 18 as that of Ex. 1 is deposited on one surface of a glass substrate used as the substrate 14. The material and thickness of each layer are as shown in Table 3.

Subsequently, SiO$_2$ as the material of the protrusion and recess portion 95 is deposited on the glass substrate surface opposite to the surface on which the antireflection layer has been deposited, and the SiO$_2$ film is processed into a protrusion and recess structure entirely composed of a kinoform, by photolithography and etching (reactive ion etching).

The processing step into a protrusion and recess structure is as follows. First, a grayscale resist mask according to the protrusion and recess pattern of kinoform of the protrusion and recess portion 95 is formed on the deposited SiO$_2$ film by using photolithography. Subsequently, the formed resist mask is subjected to reactive ion etching (maximum processing amount: 1,889 nm) where the non-covered portion in which the pattern is not covered is etched by up to 1,889 nm in the vertical direction to form the protrusion part of the protrusion and recess portion 95. After the etching, the remaining resist mask is removed. Thus, a protrusion and recess structure entirely composed of a kinoform, serving as the protrusion and recess portion 95, is obtained.

Finally, the substrate 11 and the substrate 14 are stacked by arranging the first protrusion and recess portion 12 and the protrusion and recess portion 95 to face each other. The stacking method is the same as that of Ex. 1. In this way, the diffractive optical element of this example is obtained.

In the thus-obtained diffractive optical element 10, the height of the protrusion part 151 of the protrusion and recess pattern is 2 μm or less, but the diffraction efficiency is less than 40% in the peripheral part (particularly, a region of r≥1.2 mm) and the 0th-order efficiency exceeds 40% in the peripheral part (particularly, a region of r≥1.2 mm).

In the above, the film thickness is measured by a step gauge or through cross-sectional observation by SEM (Scanning Electron Microscope). In addition, the diffraction efficiency and the 0th-order efficiency are calculated using RCWA.

While the invention has been described in detail and with reference to specific embodiments thereof, it will be apparent to one skilled in the art that various changes and modifications can be made therein without departing from the spirit and scope of the invention.

This application is based on Japanese Patent Application No. 2018-194341 filed on Oct. 15, 2018, the contents of which are incorporated herein by way of reference.

INDUSTRIAL APPLICABILITY

The present invention can be applied suitably to uses for allowing a predetermined light pattern to exit in a predetermined projection range or uses for overall irradiation. In particular, the present invention can be applied suitably to uses for applying a predetermined light pattern without reducing the diffraction efficiency or uses for applying a predetermined light pattern while reducing the 0th-order light.

REFERENCE SIGNS LIST

10 Diffractive optical element
10A Diffraction unit
11, 13, 13A, 13B Substrate
12 First protrusion and recess portion
10B Lens unit
14 Substrate
15 Second protrusion and recess portion
151 Protrusion part
152 Recess part
153 Underlying layer
17, 18, 17A, 17B, 18A, 18B Antireflection layer
21 Scattered light
22 Diffracted light group
23 Light spot

The invention claimed is:

1. A diffractive optical element, comprising:
a diffraction unit configured to split light by using a diffraction effect; and
a lens unit configured to convert incident light into parallel light, the lens unit being disposed on a light incident side of the diffraction unit,
wherein the lens unit includes:
a substrate; and
a protrusion and recess portion disposed on a side opposite to a light incident side of the substrate,
wherein the protrusion and recess portion includes:
a kinoform as a periodic structure of a relief-protrusion portion that is disposed in a central part and is a protrusion part of a relief shape having a curved cross-section, or a grating that is disposed in a central part, has three or more steps assuming the substrate as a first step and simulates the relief-protrusion portion; and
a grating having two steps disposed in a peripheral part, and
wherein the peripheral part is defined as a region in which a pitch of the protrusion and recess portion is not more than a predetermined pitch at which a 0th-order efficiency in a wavelength band of the incident light by a 2-level grating becomes lower than a 0th-order efficiency in the wavelength band of the incident light by the kinoform as the relief-protrusion portion or the grating having three or more steps.

2. The diffractive optical element according to claim 1, wherein the protrusion and recess portion is configured to act as a diffractive lens for converting incident light into parallel light.

3. The diffractive optical element according to claim 2, wherein the peripheral part is defined as a region in which a pitch of the protrusion and recess portion is not more than a predetermined pitch at which a diffraction efficiency in a wavelength band of the incident light by a 2-level grating becomes higher than a diffraction efficiency in the wavelength band of the incident light by the kinoform as the relief-protrusion portion or the grating having three or more steps.

4. The diffractive optical element according to claim 2, wherein a diffraction efficiency in the protrusion and recess portion in a wavelength band of the incident light is 40% or more all over an effective region.

5. The diffractive optical element according to claim 2, wherein a 0th-order efficiency in the protrusion and recess portion in a wavelength band of the incident light is 40% or less all over an effective region.

6. The diffractive optical element according to claim 1, wherein the protrusion and recess portion is configured to act as a diffractive lens for converting incident light into parallel light, and
wherein the protrusion and recess portion is constituted by a 8-level grating disposed in the central part, a 2-level grating disposed in a peripheral part, and a 4-level grating disposed in an annular zone part between the central part and the peripheral part.

7. The diffractive optical element according to claim 1, wherein the protrusion and recess portion is configured to act as a diffractive lens for converting incident light into parallel light, and
wherein the protrusion and recess portion is constituted by a kinoform as the relief-protrusion portion disposed in the central part, and a 2-level grating disposed in a peripheral part.

8. The diffractive optical element according to claim 1, wherein a thickness of the protrusion and recess portion is 0.2 μm or more and 4 μm or less.

9. The diffractive optical element according to claim 1, wherein a minimum pitch of the protrusion and recess portion is 0.5 μm or more and 2 μm or less.

10. An illumination optical system, comprising:
a light source configured to emit scattered light; and
the diffractive optical element according to claim 1, being configured such that the scattered light is incident on the diffractive optical element and the incident light is split into a plurality of parallel diffracted lights to exit, wherein a predetermined light pattern is formed on a predetermined projection surface by the diffracted lights exiting from the diffractive optical element.

* * * * *